United States Patent
Sugimoto

(10) Patent No.: US 11,811,978 B1
(45) Date of Patent: Nov. 7, 2023

(54) IMAGE FORMING APPARATUS

(71) Applicant: TOSHIBA TEC KABUSHIKI KAISHA, Tokyo (JP)

(72) Inventor: Shinya Sugimoto, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/847,262

(22) Filed: Jun. 23, 2022

(51) Int. Cl.
*H04N 1/00* (2006.01)

(52) U.S. Cl.
CPC ........ *H04N 1/00082* (2013.01); *H04N 1/0009* (2013.01); *H04N 1/00037* (2013.01); *H04N 1/0097* (2013.01); *H04N 2201/0094* (2013.01)

(58) Field of Classification Search
CPC ........ G06F 3/1279; G06F 21/88; G06F 3/121; G06F 3/1222; G06F 3/1229; G06F 3/1239; G06F 3/16; G06F 3/167; G06F 2203/04808; G06F 3/0219; G06F 3/0235; G06F 3/04842; G06F 3/04845; G06F 3/0488; G06F 3/04886; G06F 3/1219; G06F 3/1253; G06F 3/1256; G06F 3/1271; G06F 3/1273; G03G 15/502; G03G 15/0189; G03G 15/04072; G03G 15/0409; G03G 15/1615; G03G 15/2042; G03G 15/5045; G03G 15/5058; G03G 15/5087; G03G 15/5091; G03G 21/02; G03G 21/20; G03G 2215/00109; G03G 2215/0158; G03G 2215/2035; G03G 15/00; G03G 15/6529; G03G 15/70; G03G 21/1882; G03G 2215/0054; G03G 2215/00544;

(Continued)

(56) References Cited

U.S. PATENT DOCUMENTS 8,023,848 B2 * 9/2011 Inukai ............... G01N 9/18
399/58
8,422,897 B2 * 4/2013 Suzuki ............... G03G 15/0194
399/302

(Continued)

FOREIGN PATENT DOCUMENTS

| JP | 05-127447 | 5/1993 |
|---|---|---|
| JP | 2006-208668 | 8/2006 |
| JP | 2019-211671 | 12/2019 |

*Primary Examiner* — Negussie Worku
(74) *Attorney, Agent, or Firm* — AMIN, TUROCY & WATSON, LLP

(57) ABSTRACT

An image forming apparatus according to an embodiment includes a forming unit, an adjusting unit, a detecting unit, a storage unit and a control unit. The forming unit forms an image with respect to a medium. The adjusting unit adjusts an operating condition of the forming unit when an image is formed. The detecting unit detects approach of an operator toward the image forming apparatus. The storage unit stores setting data that indicates validity or invalidity of the detecting unit. The control unit operates, while the setting data indicates the invalidity, the adjusting unit when a first execution condition determined in advance is satisfied, and operates, while the setting data indicates the validity, the adjusting unit when the approach of the operator is not detected by the detecting unit after a second execution condition is satisfied, the second execution condition being determined in advance so as to be satisfied earlier than the first execution condition.

20 Claims, 5 Drawing Sheets

(58) Field of Classification Search
CPC .......... G03G 2215/00548; G03G 2215/00599; G03G 2215/00616; G03G 2215/00628; G03G 2221/1823; H04N 1/00891; H04N 1/0411; H04N 1/10; H04N 1/00708; H04N 1/00737; H04N 1/00779; H04N 23/633; H04N 23/80; H04N 1/00037; H04N 1/00076; H04N 1/00408; H04N 1/00474; H04N 1/00551; G06K 15/1878; B65H 2220/09; B65H 2402/441; B65H 2404/14; B65H 2511/222; B65H 2511/528; B65H 2513/51; B65H 2601/11; B65H 5/062
USPC ........................................................ 358/471
See application file for complete search history.

(56) References Cited

U.S. PATENT DOCUMENTS

| | | | | |
|---|---|---|---|---|
| 8,862,010 | B2 * | 10/2014 | Ando | G03G 15/205 |
| | | | | 399/70 |
| 9,042,762 | B2 * | 5/2015 | Satsukawa | G03G 15/502 |
| | | | | 399/82 |
| 2003/0197888 | A1 * | 10/2003 | Kondo | H04N 1/00241 |
| | | | | 358/1.15 |
| 2012/0204046 | A1 * | 8/2012 | Baba | G06F 1/3231 |
| | | | | 713/323 |
| 2017/0142278 | A1 * | 5/2017 | Tanaka | H04N 1/06 |
| 2017/0160686 | A1 * | 6/2017 | Tanaka | H04N 1/00037 |
| 2018/0143559 | A1 * | 5/2018 | Omura | G03G 15/04072 |

* cited by examiner

IMAGE FORMING APPARATUS

FIELD

Embodiments described herein relate generally to an image forming apparatus.

BACKGROUND

An image forming apparatus is known as one of devices used in a workplace for building an office environment, a remote work environment, or the like.

In the image forming apparatus, image quality changes in accordance with a change in operating conditions. Therefore, an image quality maintaining control is performed to maintain required image quality.

Although various attempts are made to enable this image quality maintaining control to be performed at an appropriate timing, it is desired that the image quality maintaining control can be performed at a more appropriate timing.

DETAILED DESCRIPTION

In general, according to one embodiment, an image forming apparatus includes a forming unit, an adjusting unit, a detecting unit, a storage unit and a control unit. The forming unit forms an image with respect to a medium. The adjusting unit adjusts an operating condition of the forming unit when an image is formed. The detecting unit detects approach of an operator toward the image forming apparatus. The storage unit stores setting data that indicates validity or invalidity of the detecting unit. The control unit operates, while the setting data indicates the invalidity, the adjusting unit when a first execution condition determined in advance is satisfied, and operates, while the setting data indicates the validity, the adjusting unit when the approach of the operator is not detected by the detecting unit after a second execution condition is satisfied, the second execution condition being determined in advance so as to be satisfied earlier than the first execution condition.

Hereinafter, an embodiment will be described with reference to the drawings. In the following embodiment, a multi-function peripheral (MFP) that includes the image forming apparatus as a printer will be described as an example.

First, a configuration of the MFP according to the present embodiment will be described.

Figure 1:
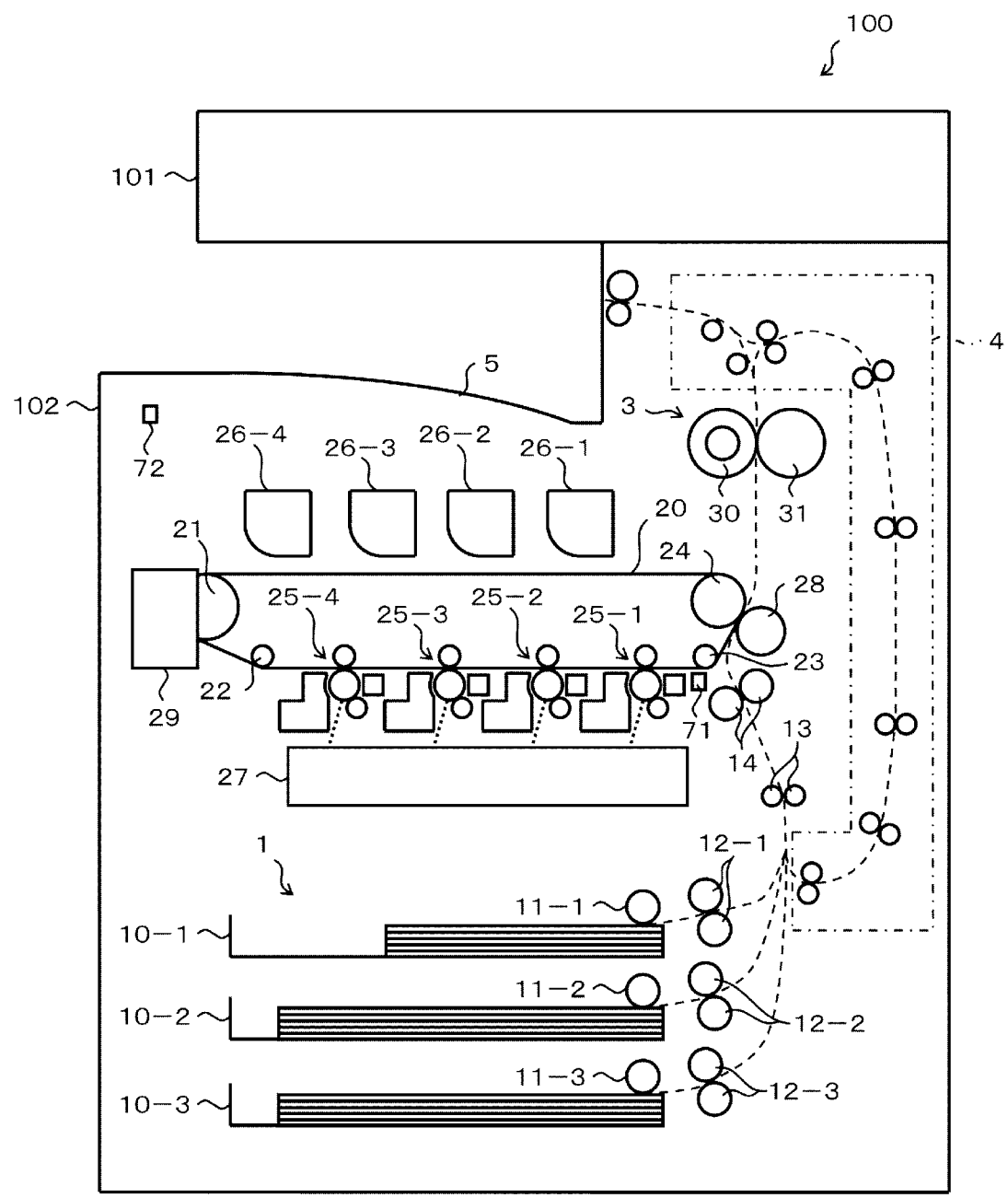
FIG. 1 is a diagram showing a mechanical configuration of a MFP according to an embodiment.

FIG. 1 is a diagram showing a mechanical configuration of an MFP 100 according to an embodiment. FIG. 1 does not strictly show the mechanical configuration of the MFP 100, and shapes and positional relations of some elements may differ from actual shapes and positional relations thereof.

As shown in FIG. 1, the MFP 100 includes a scanner 101 and a printer 102.

The scanner 101 reads an image of a document and generates image data corresponding to the image. The scanner 101 uses an image sensor such as a line sensor using, for example, a charge-coupled device (CCD) to generate image data corresponding to a reflected light image from a reading surface of the document. The scanner 101 scans a document placed on a document platen by using an image sensor that moves along the document. Alternatively, the scanner 101 uses a fixed image sensor to scan a document conveyed by an auto document feeder (ADF).

The printer 102 forms an image by an electrophotographic method with respect to a medium which is a target of image formation. The medium is typically a print paper such as a cut paper. Therefore, hereinafter, the following description is based on an assumption that a print paper is used as the medium. As the medium, a sheet material made of paper different from the cut paper may be used, and a sheet material made of a material such as a resin other than paper may be used. The printer 102 has a color printing function for printing a color image on a print paper and a monochrome printing function for printing a monochrome image on a print paper. The printer 102 forms a color image by superimposing element images obtained by using, for example, toners of three color including yellow, magenta and cyan, and toners of four color including the above three colors and black. Further, the printer 102 forms a monochrome image using, for example, a toner of black. The printer 102 may has only one of the color printing function and the monochrome printing function.

In a configuration example shown in FIG. 1, the printer 102 includes a paper feeding unit 1, a print engine 2, a fixing unit 3, an automatic duplexing unit (ADU) 4 and a paper discharge tray 5.

The paper feeding unit 1 includes paper feeding cassettes 10-1, 10-2, and 10-3, pickup rollers 11-1, 11-2, and 11-3, paper feeding rollers 12-1, 12-2, and 12-3, a conveyance roller 13, and a registration roller 14.

The paper feeding cassettes 10-1, 10-2, and 10-3 accommodate print papers in a stacking manner. The print papers accommodated in the paper feeding cassettes 10-1, 10-2, and 10-3 may be different types of print papers having different sizes and materials, or may be print papers of the same type. The paper feeding unit 1 may further include a manual feed tray.

The pickup rollers 11-1, 11-2, and 11-3 take out the print paper one by one from the paper feeding cassettes 10-1, 10-2, and 10-3, respectively. The pickup rollers 11-1, 11-2, and 11-3 feed the taken-out print paper to the paper feeding rollers 12-1, 12-2, and 12-3, respectively.

The paper feeding rollers 12-1, 12-2, and 12-3 feed, to the conveyance roller 13, the print paper fed from the pickup rollers 11-1, 11-2, and 11-3, via a conveyance path formed by a guide member and the like (not shown).

The conveyance roller 13 further conveys the print paper fed from any one of the paper feeding rollers 12-1, 12-2, and 12-3 and feeds the print paper to the registration roller 14.

The registration roller 14 corrects the inclination of the print paper. The registration roller 14 adjusts a timing of feeding the print paper to the print engine 2.

The number of sets of the paper feeding cassette, the pickup roller, and the conveyance roller is not limited to three, and any number of sets may be provided. Further, when the manual feed tray is provided, it may be not necessary to provide one set of the paper feeding cassette, and the pickup roller and the conveyance roller paired with the paper feeding cassette.

The print engine 2 includes a belt 20, support rollers 21, 22, 23, and 24, image forming units 25-1, 25-2, 25-3, and 25-4, supply units 26-1, 26-2, 26-3, and 26-4, an exposure unit 27, a transfer roller 28 and a belt cleaner 29.

The belt 20 is in an endless form, and is supported by the support rollers 21, 22, 23, and 24 so as to maintain a state shown in FIG. 1. The belt 20 rotates in a counterclockwise direction in FIG. 1 as the support roller 21 rotates. The belt 20 temporarily bears an image of a toner to be formed on a print paper with a surface located outside (hereinafter, referred to as an image bearing surface). That is, the belt 20 is an example of an image bearing member. From the viewpoint of heat resistance and abrasion resistance, for example, a semiconductive polyimide is used for the belt 20. A so-called sub-scanning is implemented by the movement of the image bearing surface accompanying the rotation of the belt 20, and a moving direction of the image bearing surface is also referred to as a sub-scanning direction.

The image forming units 25-1 to 25-4 each include a photoreceptor, a charging roller, a developing device, and a cleaner, and perform the image formation by the electrophotographic method in cooperation with the exposure unit 27. The image forming units 25-1 to 25-4 are arranged along the belt 20 in a state in which axial directions of the photoreceptors thereof are parallel to each other. The image forming units 25-1 to 25-4 differ only in colors of toners used, and have the same structure and operation. The image forming unit 25-1 forms, for example, a black element image. The image forming unit 25-2 forms, for example, a cyan element image. The image forming unit 25-3 forms, for example, a magenta element image. The image forming unit 25-4 forms, for example, a yellow element image. The image forming units 25-1 to 25-4 overlap the element images of the colors with each other on the image bearing surface of the belt 20. Accordingly, the image forming units 25-1 to 25-4 form a color image in which the element images of the colors are superimposed on the image bearing surface of the belt 20 when passing through the image forming unit 25-1. A developer may be a one-component developer made only of a toner or a multi-component developer containing other substances such as carriers in addition to the toner.

The supply units 26-1, 26-2, 26-3, and 26-4 each have a removable toner bottle housing the toner, and supply the toner housed in the mounted toner bottle to the image forming units 25-1 to 25-4, respectively. An illustration of a passage through which the toners are supplied from the supply units 26-1 to 26-4 to the image forming units 25-1 to 25-4 pass is omitted in FIG. 1.

The exposure unit 27 exposes the respective photoreceptors of the image forming units 25-1 to 25-4 according to image data representing the element images of the colors. As the exposure unit 27, a laser scanner, a light emitting diode (LED) head, or the like can be used. When the laser scanner is used, the exposure unit 27 includes, for example, a semiconductor laser device, a polygon mirror, an imaging lens system, and a mirror. In this case, for example, the exposure unit 27 selectively causes a laser beam emitted from the semiconductor laser device based on the image data to be incident on the respective photoreceptors of the image forming units 25-1 to 25-4 by switching an emission direction of the mirror. In addition, the exposure unit 27 performs scanning in the axial directions of the photoreceptors (depth direction in FIG. 1) with the above laser beam by the polygon mirror. The scanning of the laser beam is a so-called main scanning, and a direction thereof is called a main scanning direction.

The transfer roller 28 is disposed in parallel with the support roller 24, and sandwiches the belt 20 with the support roller 24. The print paper fed from the registration roller 14 is sandwiched between the transfer roller 28 and the image bearing surface of the belt 20. Further, the transfer roller 28 transfers the image of the toners formed on the image bearing surface of the belt 20 onto the print paper by using an electrostatic force.

The belt cleaner 29 removes the toner which is not completely transferred to the print paper and remains on the image bearing surface of the belt 20.

Thus, the print engine 2 forms an image by the electrophotographic method on the print paper fed by the registration roller 14. That is, the print engine 2 is an example of the forming unit.

The fixing unit 3 includes a fixing roller 30 and a pressure roller 31.

The fixing roller 30, for example, a heat-resistant metal roller houses a heater therein. The heater is, for example, an induction heating (IH) heater, and any other type of heater may be used as appropriate. By melting the toners adhered on the print paper fed from the print engine 2, the fixing roller 30 fixes the toners on the print paper.

The pressure roller 31 is provided in parallel with the fixing roller 30 and in a state of being pressed against the fixing roller 30. The pressure roller 31 sandwiches the print paper fed from the print engine 2 with the fixing roller 30 and presses the print paper against the fixing roller 30.

The ADU 4 includes a plurality of rollers and selectively performs the following two operations. A first operation is to feed the print paper passed through the fixing unit 3 to the paper discharge tray 5 as the print paper is. The first operation is performed when one-sided printing or two-sided printing is completed. A second operation is to once convey the print paper passed through the fixing unit 3 to the paper discharge tray 5 side, and then switch-back and feed the print paper to the print engine 2. The second operation is performed when the image formation only on one side of the two-sided printing is completed.

The paper discharge tray 5 receives the discharged print paper on which an image is formed.

Figure 2:
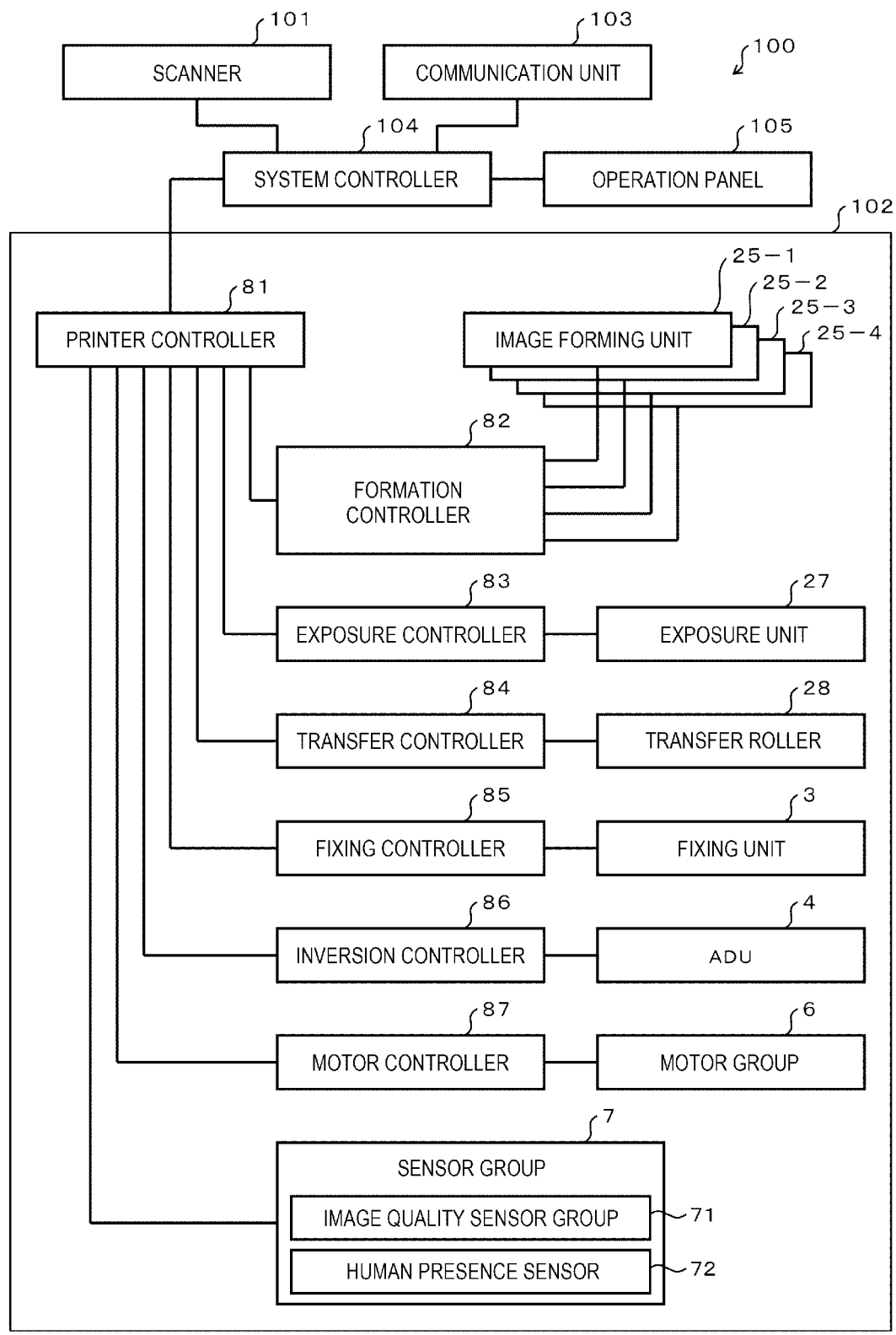
FIG. 2 is a block diagram schematically showing a configuration related to a control of the MFP.

FIG. 2 is a block diagram schematically showing a configuration related to a control of the MFP 100. In FIG. 2, the same elements as those shown in FIG. 1 are denoted by the same reference numerals, and a detailed description thereof will be omitted.

The MFP 100 includes a communication unit 103, a system controller 104, and an operation panel 105 in addition to the scanner 101 and the printer 102.

The communication unit 103 performs a process for communicating with an information terminal such as a computer device and an image terminal such as a facsimile machine via a communication network such as a local area network (LAN) and a public communication network.

The system controller 104 controls the elements constituting the MFP 100 overall in order to achieve a desired operation as the MFP 100. Further, the desired operation as the MFP 100 is, for example, an operation for implementing various functions achieved by an existing MFP.

The operation panel 105 includes an input device and a display device. The operation panel 105 inputs an instruction from an operator by the input device. The operation panel 105 displays various information to be notified to the operator by the display device. As the operation panel 105, for example, a touch panel, various switches, various lamps, and the like can be used alone or in combination as appropriate.

The fixing unit 3, the ADU 4 which are included in the printer 102, the image forming units 25-1 to 25-4, the exposure unit 27 and the transfer roller 28 described above are elements to be controlled. In addition to the above elements, the printer 102 includes a motor group 6 as an element to be controlled. The motor group 6 includes a plurality of motors for rotating the pickup rollers 11-1, 11-2, and 11-3, the paper feeding rollers 12-1, 12-2, and 12-3, the conveyance roller 13, the registration roller 14, the support roller 21, the transfer roller 28, the fixing roller 30, various rotating bodies included in the image forming units 25-1 to 25-4, and the rollers included in the ADU 4.

The printer 102 further includes a sensor group 7, a printer controller 81, a formation controller 82, an exposure controller 83, a transfer controller 84, a fixing controller 85, an inversion controller 86, and a motor controller 87.

The sensor group 7 includes various sensors for monitoring an operating state of the apparatus. The sensor group 7 includes an image quality sensor group 71 and a human presence sensor 72.

As shown in FIG. 1, the image quality sensor group 71 is disposed to face a region located between the image forming unit 25-1 and the transfer roller 28 on the image bearing surface of the belt 20. The image quality sensor group 71 includes a plurality of sensors for measuring a density and a formation position of the image formed on the image bearing surface of the belt 20. For example, the image quality sensor group 71 includes three density sensors arranged in the main scanning direction so as to be located at three locations on a front side, a center, and a rear side of the belt 20. For example, the density sensor is a reflection type optical sensor that measures the amount of reflected light on the image bearing surface of the belt 20.

The human presence sensor 72 detects the approach of the operator on a front side of the MFP 100 in order to operate the MFP 100. The human presence sensor 72 is attached to, for example, a position shown in FIG. 1. The human presence sensor 72 includes, for example, a sensor such as an infrared sensor that detects a human body standing in a detection region determined in advance on the front side of the MFP 100, and detects a state in which this sensor detects the human body as the approach of the operator. Further, a front side in FIG. 1 is the front side of the MFP 100. Therefore, the human presence sensor 72 is an example of the detecting unit that detects the approach of the operator to the MFP 100.

Under the control by the system controller 104, the printer controller 81 controls the elements constituting the printer 102 overall in order to achieve a desired operation as the printer 102.

All the formation controller 82, the exposure controller 83, the transfer controller 84, the fixing controller 85, the inversion controller 86 and the motor controller 87 operate under the control by the printer controller 81, and control operations of the image forming units 25-1 to 25-4, the exposure unit 27, the transfer roller 28, the ADU 4, and the motor group 6, respectively.

Figure 3:
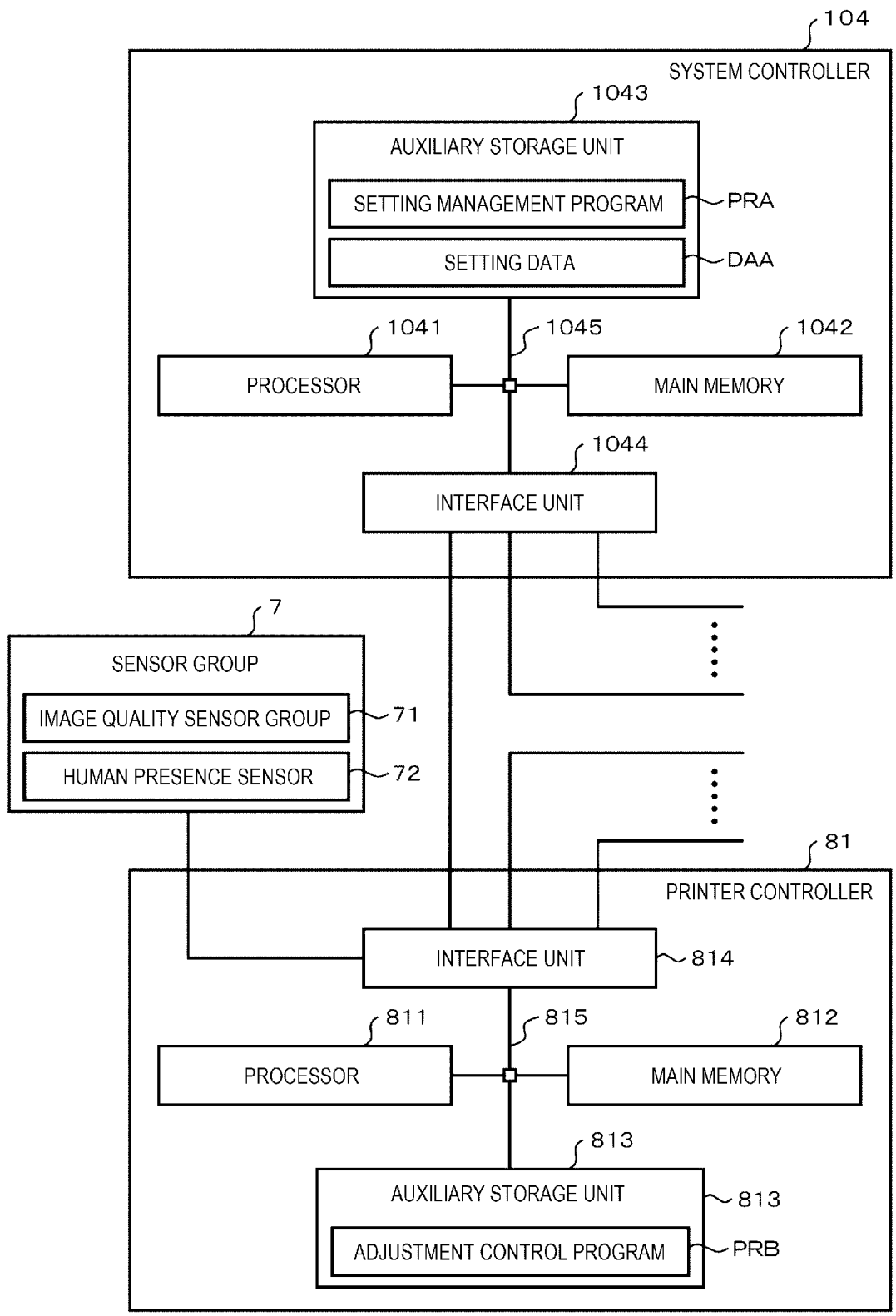
FIG. 3 is a block diagram showing main circuit configurations of a system controller and a printer controller.

FIG. 3 is a block diagram showing main circuit configurations of the system controller 104 and the printer controller 81.

The system controller 104 includes a processor 1041, a main memory 1042, an auxiliary storage unit 1043, an interface unit 1044, and a transmission line 1045.

By connecting the processor 1041, the main memory 1042, and the auxiliary storage unit 1043 via the transmission line 1045, a computer that performs an information process for controlling the elements constituting the MFP 100 overall is configured.

The processor 1041 corresponds to a central part of the computer. The processor 1041 executes an information process to be described later according to an information processing program such as an operating system, middleware, and an application program.

The main memory 1042 corresponds to a main storage part of the computer. The main memory 1042 includes a read-only memory region and a rewritable memory region. The main memory 1042 stores a part of the information processing program in the read-only memory region. Further, the main memory 1042 may store data necessary for the processor 1041 to execute a process for controlling the elements in the read-only memory region or the rewritable memory region. The main memory 1042 uses the rewritable memory region as a work area for the processor 1041.

The auxiliary storage unit 1043 corresponds to an auxiliary storage part of the computer. As the auxiliary storage unit 1043, for example, well-known storage devices such as an electric erasable programmable read-only memory (EEPROM), a hard disc drive (HDD), and a solid state drive (SSD) can be used alone or in combination. The auxiliary storage unit 1043 stores data used for the processor 1041 to perform various processes and data generated by the process performed by the processor 1041. The auxiliary storage unit 1043 may store an information processing program. In the present embodiment, the auxiliary storage unit 1043 store a setting management program PRA. The setting management program PRA is an information processing program that is described with respect to an information process for managing various settings related to the operation of the MFP 100. The auxiliary storage unit 1043 stores setting data DAA. The setting data DAA represents the settings (hereinafter, referred to as operation settings) related to the operation of the MFP 100.

The interface unit 1044 mediates data exchange among the scanner 101, the communication unit 103, the operation panel 105 and the printer controller 81.

The printer controller 81 includes a processor 811, a main memory 812, an auxiliary storage unit 813, an interface unit 814, and a transmission line 815.

By connecting the processor 811, the main memory 812, and the auxiliary storage unit 813 via the transmission line 815, a computer that performs an information process for controlling the elements constituting the printer 102 overall is configured.

The processor 811 corresponds to a central part of the computer. The processor 811 executes an information process to be described later according to an information processing program such as an operating system, middleware, and an application program.

The main memory 812 corresponds to a main storage part of the computer. The main memory 812 includes a read-only memory region and a rewritable memory region. The main memory 812 stores a part of the information processing program in the read-only memory region. Further, the main memory 812 may store data necessary for the processor 811 to execute a process for controlling the elements in the read-only memory region or the rewritable memory region. The main memory 812 uses the rewritable memory region as a work area for the processor 811.

The auxiliary storage unit 813 corresponds to an auxiliary storage part of the computer. As the auxiliary storage unit 813, for example, well-known storage devices such as an EEPROM, a HDD, and an SSD can be used alone or in combination. The auxiliary storage unit 813 stores data used for the processor 811 to perform various processes and data generated by the process in the processor 811. The auxiliary storage unit 813 may store an information processing program. In the present embodiment, the auxiliary storage unit 813 store an adjustment control program PRB. The adjustment control program PRB is an information processing program that is described with respect to an information process for controlling the execution of an adjustment operation to maintain image quality.

The interface unit 814 mediates data exchange among the sensor group 7, the system controller 104, the formation controller 82, the exposure controller 83, the transfer controller 84, the fixing controller 85, the inversion controller 86, and the motor controller 87.

Next, operations of the MFP 100 configured as described above will be described. Contents of various operations and various processes to be described below are merely examples, and it is possible to appropriately change an order of some of the operations and the processes, omit some of the operations and the processes, and add another operation and another process, and the like.

In the following, an operation different from that of the existing MFP of the same type will be mainly described, and the description of other operations will be omitted. In addition, a feature of the operations of the MFP 100 in the present embodiment is an execution control of the adjustment operation for maintaining image quality.

First, the adjustment operation that is a target of the execution control will be briefly described.

The densities and gradation reproducibilities of the element images formed by the respective image forming units 25-1 to 25-4 vary depending on variations in, for example, a development contrast potential, an exposure amount, and a ratio of screen in a process on image data. Further, the densities and the gradation reproducibilities of the element images formed by the respective image forming units 25-1 to 25-4 also vary depending on effects of preconditions at the time of the image formation such as surrounding environment or the degree of deterioration of the photoreceptors and the belt 20. In addition, a relative positional relation of the element images formed by the respective image forming units 25-1 to 25-4 may also vary. The image quality of the image formed by the printer 102 varies due to effects of these variations. An operation for compensating for such a variation in the image quality and maintaining image quality determined in advance is the adjustment operation for maintaining image quality.

More specifically, the adjustment operation is, for example, an operation of measuring a formation state of a test pattern on the image bearing surface of the belt 20 by using the image quality sensor group 71, and adjusting the operation conditions of the respective image forming units 25-1 to 25-4. Therefore, a job using the printer 102 cannot be executed while the adjustment operation is being executed.

Next, a human presence sensing function of the MFP 100 will be described.

The human presence sensing function prevents a part of the operations of the MFP 100 from being executed in a situation where the approach of the operator cannot be detected by using the human presence sensor 72. Setting the human presence sensing function to be valid or invalid can be changed according to the operation settings of the MFP 100.

When a change in the operation settings of the MFP 100 is requested, for example, by an operation determined in advance on the operation panel 105, the processor 1041 in the system controller 104 executes a change process for changing an operation setting according to an instruction from the operator based on the setting management program PRA.

Figure 4:
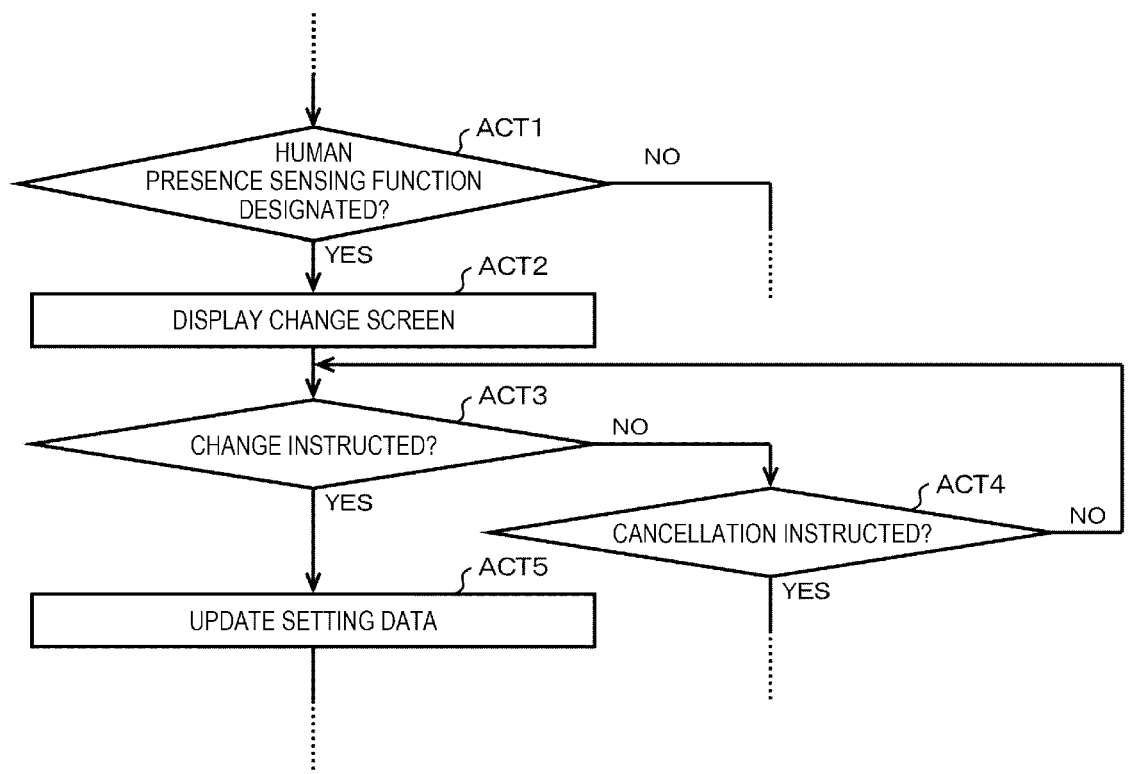
FIG. 4 is a diagram showing a part of a processing procedure of a change process performed by a processor.

FIG. 4 is a diagram showing a part of a processing procedure performed by the processor 1041 in the change process.

In ACT 1, the processor 1041 checks whether the human presence sensing function is designated while receiving a designation of an item to be changed among items of various operation settings. The processor 1041 determines YES when the human presence sensing function is designated by, for example, an operation determined in advance on the operation panel 105, and proceeds to ACT 2.

In ACT 2, the processor 1041 causes the display device included in the operation panel 105 to display a change screen. The change screen is an operation screen for receiving a designation for setting the human presence sensing function to be valid or invalid from the operator.

Figure 5:
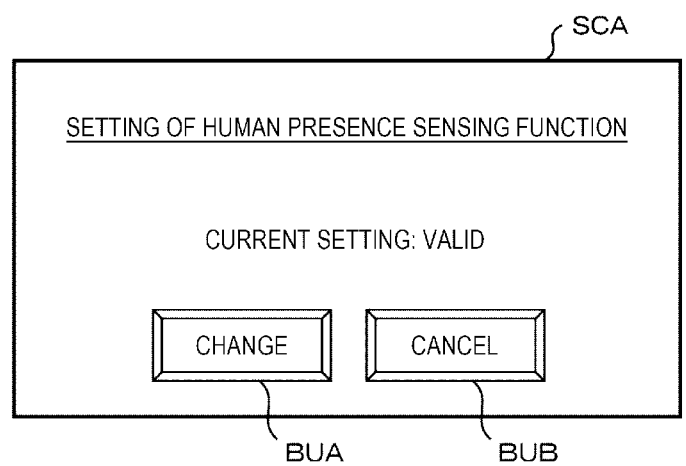
FIG. 5 is a diagram showing a change screen.

FIG. 5 is a diagram showing a change screen SCA.

The change screen SCA is an example in a situation where the human presence sensing function is set to be valid. The change screen SCA displays by character strings that the change screen SCA is a screen for changing a setting of the human presence sensing function and that the human presence sensing function is currently set to be valid, and also displays buttons BUA and BUB. The button BUA is a soft key for the operator to designate to change the setting of the human presence sensing function. The button BUB is a soft key for the operator to designate to cancel the change in the setting of the human presence sensing function.

The operator checks whether the human presence sensing function is currently valid based on the change screen SCA, and when the operator wants to change the setting, the operator instructs the change by an operation determined in advance such as tapping the button BUA. When the operator wants to maintain the current setting, the operator instructs cancellation by an operation determined in advance such as tapping the button BUB.

The processor 1041 proceeds to ACT 3 with the change screen displayed.

In ACT 3, the processor 1041 checks whether the change is instructed. When the above event cannot be checked, the processor 1041 determines NO and proceeds to ACT 4.

In ACT 4, the processor 1041 checks whether the cancellation is instructed. Further, when the above event cannot be checked, the processor 1041 determines NO and returns to ACT 3.

Thus, in ACT 3 and ACT 4, the processor 1041 waits for an instruction for change or cancellation. When the change is instructed as described above, the processor 1041 determines YES in ACT 3, and proceeds to ACT 5.

In ACT 5, the processor 1041 updates the setting data DAA such that the validity or invalidity of the human presence sensing function is indicated in an opposite way to the current setting. That is, the setting data DAA indicates the validity or invalidity of a detection related to the approach of the operator using the human presence sensor 72 as the detecting unit. The auxiliary storage unit 1043 corresponds to the storage unit that stores the setting data DAA. Then, since the processor 1041 executes the information process based on the setting management program PRA, the computer using the processor 1041 as the central part functions as an updating unit that updates the setting data.

When ACT 5 is completed, the processor 1041 shifts to a state of receiving the designation for the item to be changed among the items of the operation settings. In addition, when the cancellation is instructed as described above, the processor 1041 determines YES in ACT 4, and shifts to the state of receiving the designation for the item to be changed among the items of the operation settings without executing ACT 5.

In this way, the validity or invalidity of the human presence sensing function can be optionally set by the operator. The processor 1041 may authenticate the operator, and execute the process shown in FIG. 4 only when it can be confirmed that the operator has an authority determined in advance.

When the MFP 100 is in an operating state in which a job accompanying the image formation using the printer 102 is executed, the processor 811 of the printer controller 81 executes a control process for controlling the execution of the adjustment operation based on the adjustment control program PRB.

Figure 6:
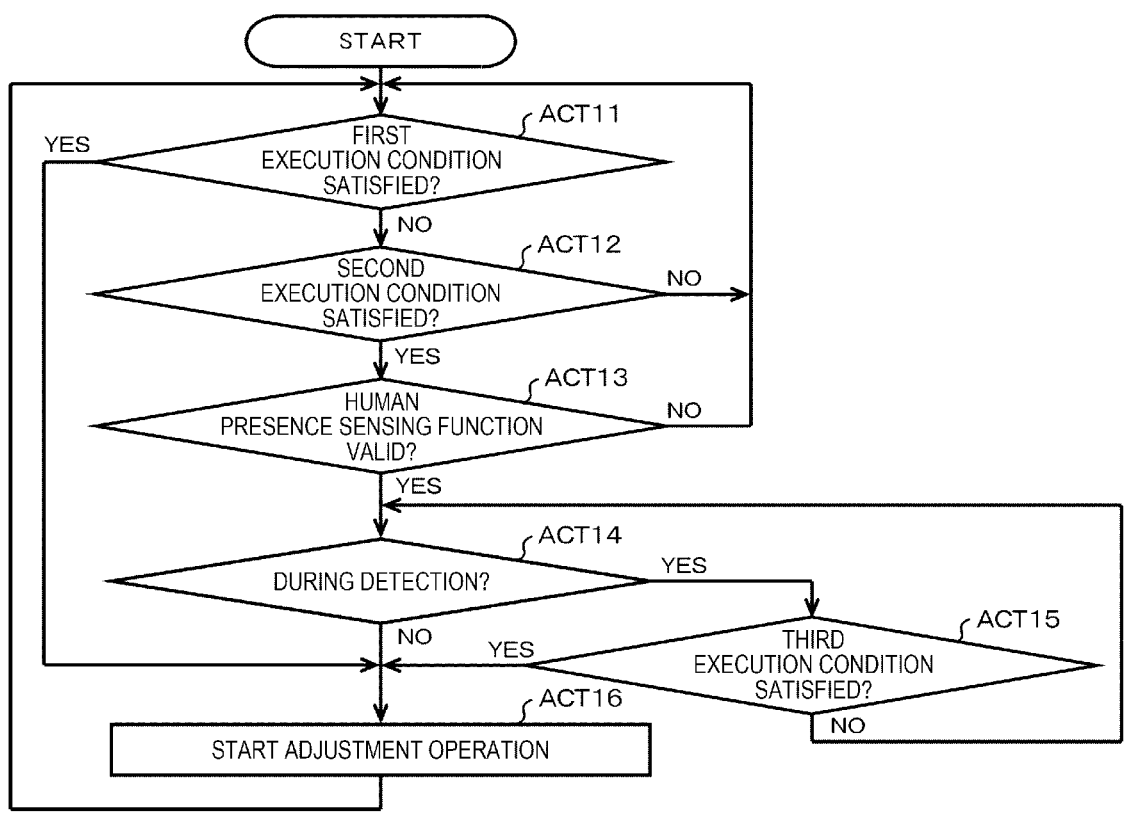
FIG. 6 is a flowchart showing a processing procedure of a control process performed by a processor.

FIG. 6 is a flowchart showing a processing procedure performed by the processor 811 in the control process.

In ACT 11, the processor 811 checks whether the first execution condition is satisfied. When the above event cannot be checked, the processor 811 determines NO and proceeds to ACT 12.

In ACT 12, the processor 811 checks whether the second execution condition is satisfied. When the above event cannot be checked, the processor 811 determines NO and returns to ACT 11.

Thus, in ACT 11 and ACT 12, the processor 811 waits for a determination that the first execution condition or the second execution condition is satisfied.

The first execution condition is determined in advance such that the first execution condition is satisfied before the image quality of the image formed by the printer 102 is significantly deteriorated. The higher a frequency at which the first execution condition is satisfied, the higher an execution frequency of the adjustment operation, so that the deterioration of the image quality can be reduced to a small extent. On the other hand, the higher the frequency at which the first execution condition is satisfied, execution efficiency of the job using the printer 102 is lowered. The first execution condition is required to be properly determined in consideration of the balance of these trade-off matters. The second execution condition is determined in advance such that the second execution condition is satisfied more frequently than the first execution condition. Since the higher the frequency at which the second execution condition is satisfied, the higher the execution frequency of the adjustment operation, the second execution condition is also required to be determined such that the frequency at which the second execution condition is satisfied is not excessive. The first execution condition and the second execution condition may be appropriately determined by, for example, a designer, an administrator or the like of the MFP 100.

As an example, it is assumed that the first execution condition and the second execution condition are conditions related to a total number of sheets of the image formation since the last execution of the adjustment operation. In this case, for example, it is conceivable that the first execution condition is the total number of sheets being 1,000, and the second execution condition is the total number of sheets being 900. The total number of sheets is one of indexes for an operation amount of the print engine 2 as the forming unit. That is, 1,000 and 900 described above correspond to a first specified amount and a second specified amount.

As an example, it is assumed that the first execution condition and the second execution condition are conditions related to a waiting time between jobs for the image formation. In this case, for example, it is conceivable that the first execution condition is the waiting time being 15 minutes, and the second execution condition is the waiting time being 13 minutes. The waiting time is one of indexes for a length of a pause period. That is, 15 minutes and 13 minutes described above correspond to a first specified time and a second specified time.

As the first execution condition and the second execution condition, only one of a plurality of different conditions as in the above examples may be valid, or all the conditions may be valid.

Thus, the second execution condition is satisfied more frequently than the first execution condition. Then, when the second execution condition is satisfied, the processor 811 determines YES in ACT 12 and proceeds to ACT 13.

In ACT 13, the processor 811 checks whether the human presence sensing function is valid. For example, the processor 811 inquires the processor 1041 to check whether the human presence sensing function is valid or invalid in the setting data DAA. Then, when the processor 811 confirms that the human presence sensing function is invalid, the processor 811 determines NO and returns to a standby state of ACT 11 and ACT 12. That is, when the human presence sensing function is invalid, the processor 811 does not execute the adjustment operation even though the second execution condition is satisfied.

When the processor 811 confirms that the human presence sensing function is valid, the processor 811 determines YES in ACT 13 and proceeds to ACT 14.

In ACT 14, the processor 811 checks whether the approach of the operator is being detected by the human presence sensor 72. Then, when the operator is being detected, the processor 811 determines YES and proceeds to ACT 15.

In ACT 15, the processor 811 checks whether a third execution condition is satisfied. When the above event cannot be checked, the processor 811 determines NO and returns to ACT 14.

Thus, when the second execution condition is satisfied, the human presence sensing function is valid, and the approach of the operator is being detected, the processor 811 is in a standby state of ACT 14 and ACT 15, and waits for a determination that the approach of the operator is not detected, or the third execution condition is satisfied.

The third execution condition is determined in advance such that the third execution condition is satisfied like the first execution condition that is satisfied after the second execution condition is satisfied, or is satisfied after the first execution condition is satisfied. The third execution condition may be appropriately determined by, for example, the designer, the administrator or the like of the MFP 100. Thus, a period of time from when the second execution condition is satisfied to when the third execution condition is satisfied corresponds to a grace period.

As an example, regarding the total number of sheets of the image formation since the last adjustment operation is performed, when 1,000 is set as the first execution condition and 900 is set as the second execution condition, 1,100 is set as the third execution condition.

As an example, regarding the waiting time, when 15 minutes is set as the first execution condition and 13 minutes is set as the second execution condition, 20 minutes is set as the third execution condition.

When the processor 811 is in the standby state of ACT 14 and ACT 15, if the operator moves away from the MFP 100 and the approach thereof cannot be detected, the processor 811 determines NO in ACT 14 and proceeds to ACT 16. When the processor 811 is in the standby state of ACT 14 and ACT 15, if the third execution condition is satisfied in the state in which the approach of the operator is detected, the processor 811 determines YES in ACT 15 and proceeds to ACT 16. Further, if the human presence sensing function is valid and the approach of the operator is not detected when the second execution condition is satisfied, the processor 811 determines NO when executing ACT 14 for the first time and proceeds to ACT 16 without being in the standby state of ACT 14 and ACT 15. If the first execution condition is satisfied when the processor 811 is in the standby state of ACT 11 and ACT 12, the processor 811 determines YES in ACT 11 and proceeds to ACT 16.

That is, the processor 811 proceeds to ACT 16 at the following first, second, third, and fourth timings.

The first timing: when the second execution condition is satisfied while the human presence sensing function is valid, and the approach of the operator is not detected.

The second timing: when the approach of the operator changes from a detected state to a not detected state after the second execution condition is satisfied while the human presence sensing function is valid.

The third timing: when the first execution condition is satisfied while the human presence sensing function is invalid.

The fourth timing: when the third execution condition is satisfied in the state in which the approach of the operator is detected after the second execution condition is satisfied while the human presence sensing function is valid.

Further, the first timing is the earliest, followed by the second timing, the third timing, and the fourth timing in that order.

In ACT 16, the processor 811 starts the adjustment operation. For example, the processor 811 starts the execution of the information process determined in advance for performing the above adjustment operation as a process different from the control process. Further, the processor 811 may perform the information process for the adjustment operation based on the adjustment control program PRB or based on another information processing program different from the adjustment control program PRB. Since the processor 811 executes the information process for the adjustment operation, the computer using the processor 811 as the central part functions as the adjusting unit. Further, since the processor 811 executes the information process based on the adjustment control program PRB, the computer using the processor 811 as the central part functions as the control unit.

In the control process, the processor 811 returns to the standby state of ACT 11 and ACT 12.

As described above, when the human presence sensing function is invalid, the MFP 100 starts the adjustment operation if the first execution condition is satisfied regardless of whether the operator is approaching. Therefore, when the adjustment operation is started in this way, if the operator attempts to cause the MFP 100 to execute a job accompanying with printing, it is necessary to wait until the adjustment operation is completed.

On the other hand, when the human presence sensing function is valid and the operator approaches to the MFP 100, the MFP 100 does not execute the adjustment operation even though the second execution condition is satisfied. Accordingly, the operator can cause the MFP 100 to promptly start the job accompanying with printing. Further, in this case, when the operator moves away from the MFP 100, the MFP 100 executes the adjustment operation. Therefore, in this case, the MFP 100 can execute the adjustment operation while minimizing the deterioration of convenience for the operator. Since the second execution condition is satisfied earlier than the first execution condition, when the operator does not approach to the MFP 100 while the second execution condition is satisfied, the adjustment operation is executed earlier than the case where the human presence sensing function is invalid. However, as described above, it is possible to prevent an execution timing of the adjustment operation when waiting for the operator to move away from the MFP 100 from being significantly delayed as compared with that when the first execution condition is satisfied, and a significant deterioration in the image quality can be prevented.

Further, when the human presence sensing function is valid and the operator approaches to the MFP 100, the MFP 100 does not execute the adjustment operation even though the second execution condition is satisfied. Then, even if a state in which the operator does not move away from the MFP 100 continues, the MFP 100 executes the adjustment operation when the third execution condition is satisfied. Therefore, the MFP 100 can prevent the adjustment operation from being unexecuted for a long period of time after the first execution condition is satisfied, and can prevent the image quality from being excessively deteriorated.

The present embodiment can be modified in various ways as follows.

The adjustment operation may not be executed until the approach of the operator cannot be detected without performing ACT 16 in FIG. 6.

The adjustment operation may be performed for other purposes than for maintaining the image quality.

A method of detecting the approach of the operator may be changed as appropriate, for example, a case where the operation of the operation panel is performed at a frequency determined in advance is detected as the approach of the operator.

The same implementation as described above can be performed in various devices other than MFPs such as copying machines, printers, and facsimile machines as long as the devices are devices that form images.

The number of image forming units is not limited to four, and it is sufficient to have at least one.

For example, the device may be an image forming apparatus that forms an image by a method different from the electrophotographic method such as an inkjet method.

Some or all of the functions achieved by the processor 811 by the information process in the above embodiment also can be achieved by hardware that executes an information process not based on a program, such as a logic circuit. The functions described above can also be implemented by combining software control with hardware such as the logic circuit described above.

While certain embodiments have been described, these embodiments have been presented by way of example only, and are not intended to limit the scope of disclosure. Indeed, the novel apparatus and methods described herein may be embodied in a variety of other forms; furthermore, various omissions, substitutions and changes in the form of the apparatus and methods described herein may be made without departing from the spirit of the disclosure. The accompanying claims and their equivalents are intended to cover such forms or modifications as would fall within the scope and spirit of the disclosure.

What is claimed is:

1. An image forming apparatus, comprising:
a forming component configured to form an image with respect to a medium;
an adjusting component configured to adjust an operating condition of the forming component when an image is formed;
a detector configured to detect approach of an operator toward the image forming apparatus;
a storage component configured to store setting data that indicates validity or invalidity of the detector; and
a controller configured to operate, while the setting data indicates the invalidity, the adjusting component when a first execution condition determined in advance is satisfied, and to operate, while the setting data indicates the validity, the adjusting component when the approach of the operator is not detected by the detector after a second execution condition is satisfied, the second execution condition being determined in advance so as to be satisfied earlier than the first execution condition.

2. The image forming apparatus according to claim 1, wherein the adjusting component performs an adjustment for maintaining a quality of an image formed by the forming component.

3. The image forming apparatus according to claim 1, wherein the controller sets a first time point when an operation amount of the forming component reaches a first specified amount as a time point when the first execution condition is satisfied, and sets a second time point when the operation amount of the forming component reaches a second specified amount, which is smaller than the first specified amount, as a time point when the second execution condition is satisfied.

4. The image forming apparatus according to claim 1, wherein the controller sets a first time point when a length of a pause period in which an operation of the forming component is continuously stopped reaches a first specified time, as a time point when the first execution condition is satisfied, and sets a second time point when the length of the pause period reaches a second specified time which is shorter than the first specified amount, as a time point when the second execution condition is satisfied.

5. The image forming apparatus according to claim 1, wherein the controller operates the adjusting component when the setting data indicates the validity and the second execution condition is satisfied while a state in which the detector detects the approach of the operator continues for a grace period determined in advance.

6. The image forming apparatus according to claim 5, wherein the controller sets a period of time during which the operation of the adjusting component completes after the first execution condition is satisfied as the grace period.

7. The image forming apparatus according to claim 5, wherein the controller sets a period of time during which the operation of the adjusting component completes when the first execution condition is satisfied as the grace period.

8. The image forming apparatus according to claim 1, wherein the detector includes a sensor configured to detect presence of a human body in a detection region determined in advance, and detects a state in which the sensor is detecting the human body as the approach of the operator.

9. The image forming apparatus according to claim 1, further comprising:
an updating component configured to update the setting data stored in the storage component in response to an operation by an operator.

10. The image forming apparatus according to claim 9, wherein the updating component updates the setting data only when the operator has an authority to determine the validity or invalidity of the detector is confirmed.

11. A method for an image forming apparatus, comprising:
forming an image with respect to a medium;
adjusting an operating condition of the image forming during formation;
detecting approach of an operator toward the image forming apparatus;
storing setting data that indicates validity or invalidity of the detector; and
operating, while the setting data indicates the invalidity, adjusting the operation condition when a first execution condition determined in advance is satisfied, and operating, while the setting data indicates the validity, adjusting the operation condition when the approach of the operator is not detected by the detector after a second execution condition is satisfied, the second execution condition being determined in advance so as to be satisfied earlier than the first execution condition.

12. The method according to claim 11, further comprising:
adjusting for maintaining a quality of an image formed.

13. The method according to claim 11, further comprising:
setting a first time point when an operation amount reaches a first specified amount as a time point when the first execution condition is satisfied; and
setting a second time point when the operation amount reaches a second specified amount, which is smaller than the first specified amount, as a time point when the second execution condition is satisfied.

14. The method according to claim 11, further comprising:
setting a first time point when a length of a pause period in which an operation is continuously stopped reaches a first specified time, as a time point when the first execution condition is satisfied; and
setting a second time point when the length of the pause period reaches a second specified time which is shorter than the first specified amount, as a time point when the second execution condition is satisfied.

15. The method according to claim 11, further comprising:
adjusting when the setting data indicates the validity and the second execution condition is satisfied while a state in which detection of the approach of the operator continues for a grace period determined in advance.

16. The method according to claim 15, further comprising:
setting a period of time during which the operation completes after the first execution condition is satisfied as the grace period.

17. The method according to claim 15, further comprising:
setting a period of time during which the operation completes when the first execution condition is satisfied as the grace period.

18. The method according to claim 11, further comprising:

detecting presence of a human body in a detection region determined in advance, and detecting a state in which the human body approaches as the operator.

19. The method according to claim 11, further comprising:

updating the setting data stored in response to an operation by an operator.

20. The method according to claim 19, further comprising:

updating the setting data only when the operator has an authority to determine the validity or invalidity of the detecting is confirmed.

\* \* \* \* \*